United States Patent [19]
Ortiz et al.

[11] Patent Number: 5,873,617
[45] Date of Patent: Feb. 23, 1999

[54] NOISE DAMPING SYSTEM ON RAILROAD WHEELS

[75] Inventors: German Gimenez Ortiz; Aitor Castanares Etxezarreta; Victor Arriola Trueba; Juan Arteaga Galarraga, all of Beasain, Spain

[73] Assignee: Construcciones y Auxiliar de Ferrocarriles S.A. CAF, Beasain, Spain

[21] Appl. No.: 903,463

[22] Filed: Jul. 30, 1997

[30] Foreign Application Priority Data

Jul. 30, 1996 [ES] Spain ................................. 9601704

[51] Int. Cl.⁶ ......................................... B60B 17/00
[52] U.S. Cl. .................................................. 295/7
[58] Field of Search ................... 295/7, 8, 11, 21, 295/23; 74/443; 105/452

[56] References Cited

U.S. PATENT DOCUMENTS

| | | | |
|---|---|---|---|
| 2,605,132 | 7/1952 | Watter | 74/443 X |
| 4,254,985 | 3/1981 | Kirschner | 295/7 |
| 4,364,594 | 12/1982 | Raquet | 295/7 |
| 4,496,183 | 1/1985 | Kasper et al. | 105/452 X |
| 5,386,894 | 2/1995 | Barca | 295/7 X |

FOREIGN PATENT DOCUMENTS 16774  1/1882  Germany ................................. 295/7

*Primary Examiner*—Russell D. Stormer
*Attorney, Agent, or Firm*—Ostrolenk, Faber, Gerb & Soffen, LLP

[57] ABSTRACT

A noise damping system for a railroad wheel: at one axial side of the wheel a groove is formed having radially inward and radially outward sides. A ring is installed in the groove. When one set of opposing sides, e.g. the radially outward sides, is engaged, they transmit torque. The ring and the groove are cooperatingly either trapezial in shape, that is one radial side inclined and one axial direction side, or are shaped with both radial sides uninclined. Screws secure the ring into the wheel and establish a torque transmitting connection between their opposing engaged sides. The ring may be in sections fastened together at the wheel to form the complete ring.

9 Claims, 2 Drawing Sheets

NOISE DAMPING SYSTEM ON RAILROAD WHEELS

BACKGROUND OF THE INVENTION

The present invention refers to a system for damping noise produced by railroad wheels during the travel by railroad vehicles and particularly to a damping ring in the wheel.

Known devices intended for the reducing the noise produced by railroad wheels may be grouped under the following types:

Resilient wheels: on such wheels, the rim of the wheel is constituted by a bandage joined to the rest of the wheel by means of elastic elements.

Damped wheels: wheels on which dampers are added by means of external elements: a) by viscoelastic elements, such as foils and rubber elements, adhered to the wheel and tuned for different frequencies, and b) by friction, such as elements joined to the wheel, which cause relative slippage as regards the surface of the wheel, producing friction which provides damping.

The object of the invention is found in this latter subgroup.

In noise damping by friction, the use of a circular sectioned ring is known, tied down in a groove or channel with semicircular section on the inner part of the wheel rim. However, in this arrangement, there are no elements which permit control over the uniformity of contact and the circumferential torque. Besides, the assembly process induces differences in the contact between different points. On the other hand, the arrangement provides little mass for a specific width of the groove or channel, movement of rigid solids may be produced, and it is impossible to displace the channel up to the flat external surface of the rim.

The inventors have confirmed that there are three main parameters for the efficacy of noise damping systems by friction: a) ring mass; b) optimization of the contact area between ring and wheel; and c) position of the ring with respect to the wheel rim.

Upon increase of the ring mass (the mass-ring/mass-wheel relation increases) an increase in the damping of the system is produced, and its efficacy improves (both in average and in high frequency). It is therefore beneficial to increase the mass of the ring as much as possible.

For a specific width in the groove or channel where the ring is housed, it is advisable that the shape of the ring offer the greatest possible mass.

Regarding the second parameter, it has been confirmed that the contact area between the surfaces of the ring and of the wheel constitutes another main parameter of the system, because the noise damping mechanism is ultimately based on the friction produced in the contact between the two surfaces by microslippage between them.

The slipping work depends on:

$$(W=\mu.N.I.):$$

where $\mu$ is the friction coefficient, N the normal load between the surfaces and I the relative slippage between both surfaces.

Given a coefficient $\mu$, upon increase of the normal load between the surface, the work of the friction may increase (N increases) though however, the possibility of movement is made more difficult (could decrease I). Consequently, a compromise solution exists in which, for a specific torque between the surfaces, an optimum exists in the work of the friction.

On the other hand, besides achieving a specific torque, it is important to achieve uniformity in the contact area between ring and wheel. Non-uniform contact produces the existence of zones which work adequately and zones which do not work (even with lack of contact); including the possibility of movement of the rigid solid of the ring as regards the wheel, according to which, the system would work in a totally different manner. All this causes a decrease in the global efficacy and possible dispersions of the results.

Finally, regarding the third parameter, the position of the ring with respect to the wheel rim, the research carried out shows that between the different positions of a possible damping ring, within the width of the wheel rim, the end positions (removed from the midplane, perpendicular to the wheel axis) are more efficient and, particularly, the inner side of the wheel (side of the flange) is slightly more favorable.

SUMMARY OF THE INVENTION

Based on the previous considerations, in the present invention, a noise damping system is developed on railroad wheels by assembly of a ring in a groove or an annular spline formed on the rim of the wheel, which is characterized in that the groove or spline and the ring have cross sections which are limited by straight sides, the splines being formed preferably starting from the lower side of the rim. Additionally, according to the invention, the ring and spline are related with mutual torque means.

The system which is the object of the invention permits the maximum use of the three main previously indicated parameters, contrary to what occurs with other traditional noise damping elements.

Experimentally, it has been confirmed that under radial axial impacts, the currently known systems attain a noise attenuation (dBA) of up to 9 dBA, while, with the system of the invention, noise attenuations of up to 13 dBA may be achieved.

The system of the invention presents the following main characteristics:

arrangement of the ring, which is tied down in a housing preformed on the end of the wheel rim;

comprises a torque system or controlled contact between the ring and the rim, which may be achieved by means of through-screws passing through the rim, or by means of a fit;

shape of the ring, with a cross section of straight sides, having for example, a trapezial or rectangular section, optimizing the mass of the ring;

preferably a whole ring, of one piece, although it may be divided into two or more parts by means of transverse cuts to facilitate its assembly;

ring assembly on the inner side of the rim, on the outer side or on both sides simultaneously.

BRIEF DESCRIPTION OF THE DRAWINGS

The characteristics and advantages of the system of the invention are described in detail, with the help of the enclosed drawings, in which a possible embodiment is represented, as a non-restrictive example.

DESCRIPTION OF THE PREFERRED EMBODIMENTS

Figure 1:
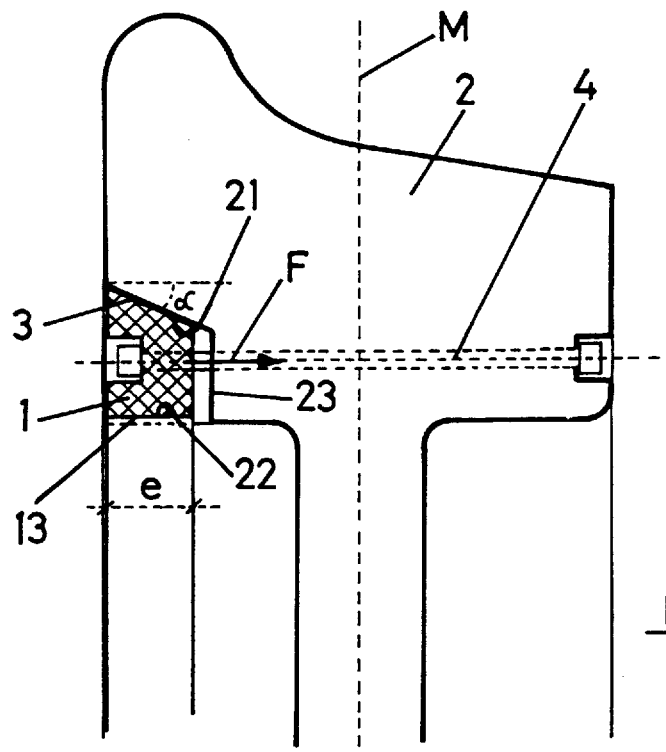
FIG. 1 is an end section of a wheel rim which includes a ring according to the invention.

FIG. 1 shows a ring 1 assembled into a channel preformed on a rim 2 of a railroad wheel. The channel is formed in the axially inner side of the wheel. The channel or groove has a radially outward side 21, a radially inward side 22, and a bottom 23.

The ring has an inwardly tapering radially outer surface 3 and an untapered radially inner surface 13, described here as having a trapezial section. For a given axial width "e", that shape of ring 1 permits attainment of maximum ring mass. Other possible shapes for the ring section, for example circular, offer less area (less mass), for an equal width "e". Thus, the first parameter, which intervenes in the efficacy of the absorption of noise, is optimized.

The sloped or tapering outer surface 3 of the trapezial section of ring 1, which forms the angle alpha, permits the contact between the ring 1 and the correspondingly inclined inner surface of the groove 21 in the rim 2 to be circumferentially uniform. By means of the necessary machining, ring 1 may be provided with adequate surface quality and tolerances for ensuring perfect contact with rim 2 of the wheel.

In FIG. 1, ring 1 is affixed to the wheel by torque elements comprising through-screws 4. The force F provided by the screws is variable by adjustment of the torque. The force F together with the angle alpha, improves the contact between ring 1 and the wall of the mortise or channel preformed on rim 2 of the wheel, varying the contact forces between both surfaces as the torque of screws 4 varies.

For a given wheel and ring, there is an optimum torque on the screws 4, dependent upon the angle alpha, to provide maximum damping to the wheel. The optimum torque is defined for each case.

This improves the second parameter which intervenes in the efficacy of noise absorption, as it aids in the optimization of the contact surfaces between ring and wheel.

In FIG. 1, ring 1 occupies the most removed position possible from the half or mid-width plane M of the wheel, and perpendicular to the axis of the wheel for optimizing the third parameter for effective noise absorption.

Figure 2:
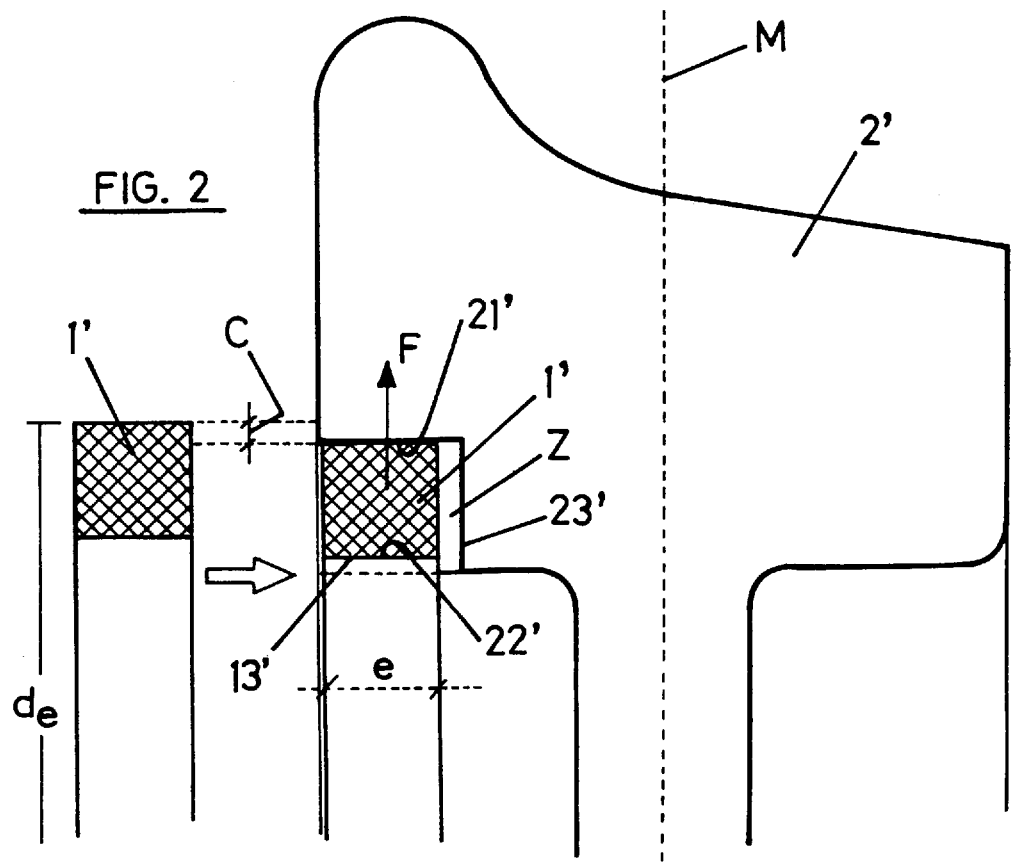
FIG. 2 is a similar section to FIG. 1, showing a variant embodiment.

The arrangements described in FIGS. 1 and 2 require the ring to be always positioned starting from the axial side surfaces of the wheel rim (inner or outer), which is preferable from the point of view of the reduction of acoustic emission.

In FIG. 2, ring 1' has a rectangular section, with an a outer diameter (de) that is greater than the diameter of the housing-mortise preformed in rim 2' of the wheel. As a result, an interference fit (c) is produced.

A conventional method, for example, heat dilations/shrinkings, enables ring 1' to be inserted in the housing. The fit pressure and the preload between the ring 1' and the rim 2' of the wheel remain set by the interference fit.

The solutions offered by the variants of FIGS. 1 and 2 may be combined. In both cases, an axial zone (z) without contact may exist in the housing mortise of the rim, between the confronting axial sides of the ring and rim.

The shape of ring 1 and the tie-down or screw 4 allows the outer dimensions of the wheel with the ring to be the same as the original wheel. This makes it possible that any other element which the wheel may be capable of carrying be assembled, such as brake discs etc.

Ring 1 is placed at one side of the rim 2 of the wheel, which may be at the inner side, as in FIG. 1, on the outer side, or even on both sides. The ring must be manufactured with adequate tolerances and may be whole or divided in two halves for easing assembly and disassembly on the assembled axis wheel, already in service, such as is shown in FIGS. 3 through 5.

Figure 3:
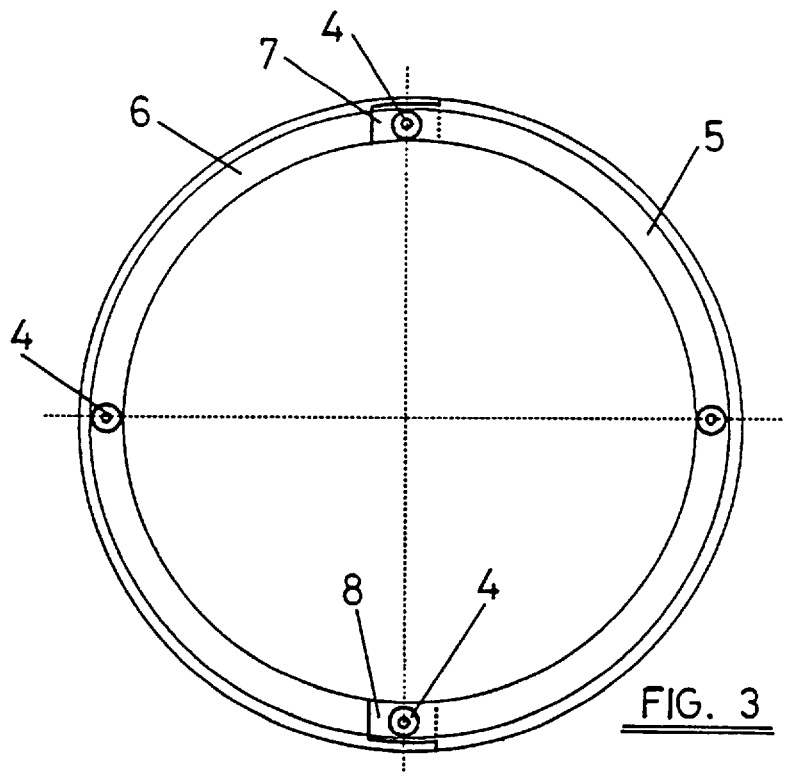
FIG. 3 is an axial view of the ring which represents the possible location of the torque screws as well as the cutting option for the ring, to facilitate the assembly.
Figure 4:
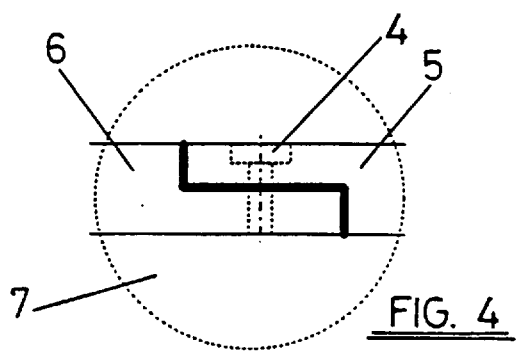
FIGS. 4 and 5 correspond to details which represent two possible forms of joining or meeting of the sections which form the ring of FIG. 3.

In the case of a divided ring, the tie-down system between the two halves 5 and 6 may be carried out in the manner indicated in FIGS. 3 and 4.

Figure 5:
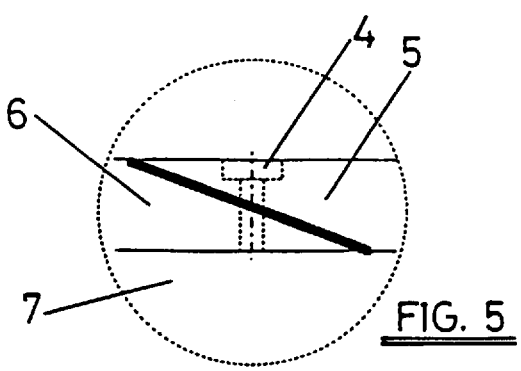

The ring is cut at points 7 and 8, coinciding with two of the torque screws 4, by means of a cut which may adopt the shape shown in either of FIGS. 4 or 5. In both cases overlapped sections exist, which may be joined to each other by means of one of the torque screws 4.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A noise damping system for a railroad wheel using friction damping, said damping system comprising:

a railroad wheel having an axis, an axially inward side, an axially outward side opposite the inward side and a periphery joining the inward and outward sides;

a groove or annular spline formed into one of the axial sides of the wheel, the groove having a radially inward and a radially outward side, the radially inward and radially outward sides extending inward from the one side of the wheel, at least one of the groove sides being formed at an angle with respect to the axis;

a ring disposed in the groove, the ring having radially inward and radially outward sides, one of the ring sides cooperating with one of the sides of the groove for engaging that groove side, and the cooperating ring and groove sides being respectively shaped to transmit the energy of the wheel between the wheel and the ring; and means securing the ring to the wheel for enabling application of mutual force between them.

2. The noise damping system of claim 1, wherein the at least one groove side formed at an angle is the radially outward groove side, the radially outward groove side and the radially outward side of the ring each tapering inwardly along the axial direction from the respective one side of the wheel and the radially outward sides of the ring and the groove being the cooperating sides.

3. The noise damping system of claim 2, wherein the radially inward side of the ring is non-tapering.

4. The system of claim 1, wherein the means securing the ring comprise screws extending parallel to the wheel axis and passing through the ring and the wheel.

5. The system of claim 4, wherein the ring is subdivided into at least two partial ring sections connectable to each other to define a complete ring; the screws passing through the ends of the ring sections for connecting the ring sections to each other and to the wheel.

6. The system of claim 1, wherein the ring is assembled in the groove with the cooperating side of the groove engaging the cooperating side of the ring with a preset load.

7. The system of claim 6, wherein the other radial side of the ring is out of contact with a side of the groove opposite the cooperating side of the groove so that the cooperating side of the ring contacts only the cooperating side of the groove with a preset preload.

8. The system of claim 1, wherein the other radial side of the ring is out of contact with a side of the groove opposite the cooperating side of the groove so that the cooperating side of the ring contacts only the cooperating side of the groove with a preset preload.

9. The system of claim 1, wherein the ring is subdivided into at least two partial ring sections connectable to each other to define a complete ring.

* * * * *